(12) United States Patent
Yang et al.

(10) Patent No.: US 9,187,348 B2
(45) Date of Patent: Nov. 17, 2015

(54) ELECTRODE FOR CAPACITIVE DEIONIZATION DEVICE AND CAPACITIVE DEIONIZATION DEVICE HAVING THE ELECTRODE

(75) Inventors: Ho-jung Yang, Suwon-si (KR); Hyo-rang Kang, Anyang-si (KR); Dai-soo Lee, Seoul (KR)

(73) Assignees: SAMSUNG ELECTRONICS CO., LTD. (KR); JEONBUK NATIONAL UNIVERSITY INDUSTRY FOUNDATION (KR)

( * ) Notice: Subject to any disclaimer, the term of this patent is extended or adjusted under 35 U.S.C. 154(b) by 958 days.

(21) Appl. No.: 12/141,535

(22) Filed: Jun. 18, 2008

(65) Prior Publication Data
US 2009/0020430 A1 Jan. 22, 2009

(30) Foreign Application Priority Data
Jul. 18, 2007 (KR) ........................ 10-2007-0071703

(51) Int. Cl.
*H01B 1/24* (2006.01)
*C02F 1/469* (2006.01)
*C02F 1/461* (2006.01)

(52) U.S. Cl.
CPC ................ *C02F 1/4691* (2013.01); *H01B 1/24* (2013.01); *C02F 2001/46133* (2013.01)

(58) Field of Classification Search
None
See application file for complete search history.

(56) References Cited

U.S. PATENT DOCUMENTS

| 5,196,115 A | 3/1993 | Andelman |
| 5,296,261 A | 3/1994 | Bouet et al. |
| 5,425,858 A | 6/1995 | Farmer |
| 5,776,633 A * | 7/1998 | Mrotek et al. ............. 429/231.8 |
| 6,406,817 B2 | 6/2002 | Wariishi et al. |
| 6,702,963 B2 * | 3/2004 | Kibi et al. .................... 264/29.6 |
| 6,781,817 B2 | 8/2004 | Andelman |
| 7,090,946 B2 | 8/2006 | Mitchell et al. |
| 7,835,137 B2 | 11/2010 | Kang et al. |
| 8,021,788 B2 | 9/2011 | Kim et al. |
| 8,119,289 B2 | 2/2012 | Fukumine et al. |
| 8,202,642 B2 | 6/2012 | Sumihara et al. |
| 2002/0122985 A1 * | 9/2002 | Sato et al. ..................... 429/232 |
| 2004/0130851 A1 | 7/2004 | Faris |

(Continued)

FOREIGN PATENT DOCUMENTS

| JP | 2003-323898 A | 11/2003 |
| JP | 2004251445 A | 9/2004 |

(Continued)

OTHER PUBLICATIONS

Final Office Action dated Sep. 6, 2012 from U.S. Appl. No. 12/533,777, filed Jul. 31, 2009, 12 pages.

(Continued)

*Primary Examiner* — Lyle Alexander
*Assistant Examiner* — Michelle Adams
(74) *Attorney, Agent, or Firm* — Cantor Colburn LLP

(57) ABSTRACT

Disclosed herein is an electrode for capacitive deionization device including an active material, a waterborne polyurethane, and a conducting agent. Disclosed herein too is a method of manufacturing the electrode and a capacitive deionization device employing the electrode. The waterborne polyurethane is a product of reaction of a polyurethane prepolymer prepared by reacting a polyol, a diisocyanate-based compound, and a dispersing agent, with a neutralizing agent and a chain extending agent.

5 Claims, 3 Drawing Sheets

(56) References Cited

U.S. PATENT DOCUMENTS

| | | | |
|---|---|---|---|
| 2006/0235144 A1* | 10/2006 | Hwang et al. | 524/591 |
| 2006/0251956 A1* | 11/2006 | Kim et al. | 429/62 |
| 2007/0178373 A1 | 8/2007 | Hwang et al. | |
| 2008/0213671 A1 | 9/2008 | Kogetsu et al. | |
| 2009/0020430 A1 | 1/2009 | Yang et al. | |
| 2009/0124746 A1* | 5/2009 | Handa et al. | 524/496 |

FOREIGN PATENT DOCUMENTS

| | | | |
|---|---|---|---|
| JP | 2005-103518 A | | 4/2005 |
| KR | 1019990043892 B1 | | 6/1999 |
| KR | 1020010042427 A | | 5/2001 |
| KR | 1020020030030 A | | 4/2002 |
| KR | 1020030093252 A | | 12/2003 |
| KR | 1020040038047 A | | 5/2004 |
| KR | 1020040054352 A | | 6/2004 |
| KR | 1020040078284 A | | 9/2004 |
| KR | 1020050084613 A | | 8/2005 |
| KR | 1020060024436 A | | 3/2006 |
| KR | 1020060105034 A | | 10/2006 |
| KR | 1020060108792 A | | 10/2006 |
| KR | 1020070071703 A | | 7/2007 |
| WO | WO-2007046409 A1 * | | 4/2007 |

OTHER PUBLICATIONS

Non-Final Office Action dated Apr. 26, 2012 from U.S. Appl. No. 12/533,777, filed Jul. 31, 2009, 28 pages.

Non-Final Office Action dated Nov. 19, 2012 from U.S. Appl. No. 12/533,777, filed Jul. 31, 2009, 22 pages.

Korean Office Action for Korean Patent Application No. 10-2007-0071703 dated May 15, 2013 with English Translation.

Korean Office Action for Korean Patent Application No. 10-2007-0071703 dated Oct. 16, 2013 with English Translation.

* cited by examiner

ELECTRODE FOR CAPACITIVE DEIONIZATION DEVICE AND CAPACITIVE DEIONIZATION DEVICE HAVING THE ELECTRODE

This application claims priority to Korean Patent Application No. 10-2007-0071703, filed on Jul. 18, 2007, and all the benefits accruing therefrom under 35 U.S.C. §119, the contents of which in its entirety is incorporated hereby by reference.

BACKGROUND OF THE INVENTION

This disclosure relates to an electrode for capacitive deionization device, and too a method of manufacturing the electrode and a capacitive deionization device that comprises the electrode.

Recently, rapid industrialization has inflicted damage to the environment and has induced climatic change. Thus, clean water has been drying up, while demand for purified water has been increasing due to increases in human population and improvements in the standard of living. In addition, a lot of attention has been paid to develop a method of purifying water.

Water softener, which converts hard water to soft water acts to reduce the amount of cations in water to less than a predetermined level. In general, ion exchange resins have been used in water softening systems to soften water. In such systems, cations (such as bivalent ions) present in the hard water are removed by being exchanged with $Na^+$ ions adsorbed to the ion exchange resin. The $Na^+$ ions are thus released into the water while the bivalent ions are adsorbed into the ion exchange resin. When the ion exchange resin is saturated with the bivalent ions and the capability of the resin for further exchange of ions is reduced, the resin is restored through a reversible reaction by bringing NaCl into contact with it. The bivalent ions adsorbed to the resin are desorbed through a concentration differential by contacting it with a large amount of NaCl, and $Na^+$ is adsorbed to the ion exchange resin again. The ion exchange resin is widely used in water softener systems and is easily available.

However, the ion exchange resin has a serious drawback with regard to secondary waste, since about 100 pounds of NaCl is required to restore 1 pound of the ion exchange resin. In addition, water generated during the regeneration of the ion exchange resin contains a large amount of $Cl^-$ ions, thereby being harmful to plants. Accordingly, damage to crops by the waste water containing $Cl^-$ ions is often reported in farms across the United States, and the costs for treating $Na^+$ ions is therefore increasing. Thus, the development of technology replacing such ion exchange resins is urgently required to inhibit such environmental damage.

Capacitive Deionization (CDI) is a system in which ionic materials in a medium are adsorbed on the surface of an electrode and then removed by applying a voltage to a nano porous carbon electrode so as to provide the electrode with a polarity. The adsorbed ionic materials are discharged with water by applying an inverse voltage to the electrode during its regeneration. This system has similar characteristics to conventional supercapacitors. CDI is advantageous since chemicals are not required for regeneration, and ion exchange resins, expensive filters or membranes are not required. Elements of hard water and harmful ions are removed and capacitance increases in CDI.

In CDI, when a direct current having a low potential difference is applied to water flowing between the carbon electrodes in which ions are dissolved, anions among the dissolved ions are adsorbed on the cathode and cations are adsorbed on the anode. When the application of the direct current ceases, the concentrated ions are desorbed from the electrodes and removed. Here, low resistance and wide specific surface area are desirable properties for the carbon electrodes. Thus, the carbon electrode may be prepared by binding active carbon using a polytetrafluoroethylene (PTFE) binder, or by forming a plate through carbonization of a resorcinol formaldehyde resin and complicated drying process (U.S. Pat. Nos. 5,196,115 and 5,425,858).

However, the electrode using the active carbon and the PTFE binder needs to be prepared from a paste, and thus operational efficiency may decrease, and electrical conductivity may decrease since a large amount of the binder is required.

Although the electrode prepared from resorcinol formaldehyde resin has high efficiency since it has low electric resistance and wide specific surface area, the preparation process is very complicated, and thus manufacturing costs, working load, and maintenance expenses are high.

BRIEF SUMMARY OF THE INVENTION

Disclosed herein is an electrode for a capacitive deionization device, an electrode for an electrochemical double layer capacitor, and a method of manufacturing thereof by developing a binder which enables a slurry coating and does not require a thickening agent to improve operational efficiency, while increasing electrical conductivity and improving accessibility to an electrolytic solution.

Disclosed herein too is a capacitive deionization device and an electrochemical double layer capacitor employing the electrode having a maximized adsorption rate of dissolved ions that reduces manufacturing costs and working load.

Disclosed is an electrode for capacitive deionization including an active material, a waterborne polyurethane, and a conducting agent.

Disclosed is a method of manufacturing an electrode for capacitive deionization. The method includes preparing a polyurethane solution by adding an amphiphilic solvent to a waterborne polyurethane dispersion prepared by dispersing a waterborne polyurethane in water; preparing a composition for an electrode active material by mixing an active material, a conducting agent, the polyurethane solution, and the amphiphilic solvent; and coating the composition for an electrode active material on a support and drying the composition to form an electrode.

The waterborne polyurethane may be prepared through the reaction of a polyurethane prepolymer with a neutralizing agent and a chain extending agent. The polyurethane prepolymer is prepared by reacting a polyol, a diisocyanate-based compound, and a dispersing agent.

Disclosed is a capacitive deionization device using the electrode.

Disclosed is an electrode for an electrochemical double layer capacitor, the electrode including an active material, a waterborne polyurethane and a conducting agent, and an electrochemical double layer capacitor including the electrode.

BRIEF DESCRIPTION OF THE DRAWINGS

The above and other features and advantages of the disclosed embodiments will become more apparent by describing in detail exemplary embodiments thereof with reference to the attached drawings in which.

DETAILED DESCRIPTION OF THE EMBODIMENTS

Figure 1:
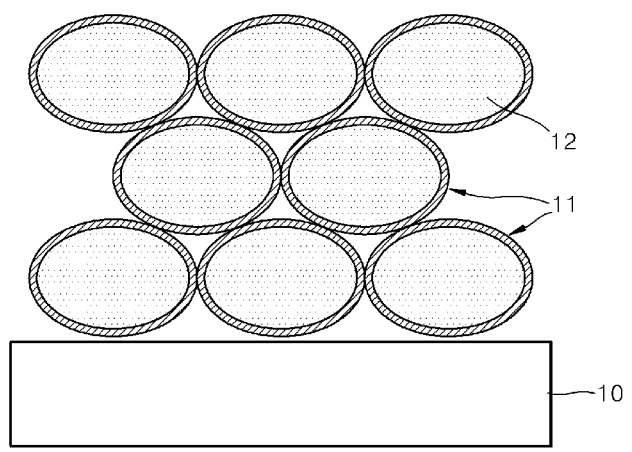
FIG. 1 shows a schematic structure of an electrode.

Hereinafter, disclosed embodiments will be described more fully with reference to the accompanying drawings, in which exemplary embodiments of the invention are shown.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second" and the like do not imply any particular order but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements and the thicknesses of layer and regions are exaggerated for clarity.

An electrode for capacitive deionization device according to an embodiment comprises an active material, a waterborne polyurethane, and a conducting agent. In particular, the electrode for capacitive deionization includes a support and an active material layer having an active material formed on the support, a waterborne polyurethane, and a conducting agent. Here, the support can be formed of carbon paper, carbon felt, carbon cloth, metal foam, metal paper, metal felt, metal cloth, or the like.

The electrode is prepared according to the following process.

A polyurethane solution is prepared by adding an amphiphilic solvent to a polyurethane dispersion. Here, the polyurethane dispersion is prepared by dispersing a waterborne polyurethane in water. The waterborne polyurethane may be prepared through the reaction of a polyurethane prepolymer with a neutralizing agent and a chain extending agent. The polyurethane prepolymer is prepared by reacting a polyol, a diisocyanate-based compound, and a dispersing agent.

The term "amphiphilic" used herein indicates a single molecule having a hydrophilic group (polar group) and a hydrophobic group (non-polar group), and the term "waterborne polyurethane" indicates a polyurethane that is dispersible in water.

Conventionally, a carboxymethylcellulose (CMC) has been used as a binder to prepare an active material, but CMC is water soluble and thus it cannot be used in a system employing an aqueous electrolytic solution. In addition, when only a polyurethane binder is used, the hydrophobic active carbon (which is used as an active material) is not easily dispersed in the polyurethane. Thus, an electrode having a uniform composition cannot be formed.

However, in one embodiment, the amphiphilic solvent is blended with a polyurethane. The polyurethane interacts with the amphiphilic solvent (for example, a hydrophobic group of the amphiphilic solvent such as alcohol, and is dissolved therein to form a polyurethane solution) to form a composition that can be used in the active material layer. The active material layer thus has stability and displays excellent adhesion to a current collector (by using the polyurethane) without the presence of carboxymethylcellulose (CMC). In addition, the composition (urethane solution) can be coated in the form of a slurry on the active material such as active carbon in a simple coating process.

The amphiphilic solvent can be alcohol, acetone, and 1-methyl-2-pyrrolidone. The alcohol can be propanol, butanol, pentanol, hexanol, heptanol, octanol, or the like, or a combination comprising at least one of the foregoing alcohols. The amount of the amphiphilic solvent may be in a range of 500 to 10,000 parts by weight based on 100 parts by weight of the waterborne polyurethane. When the amount of the amphiphilic solvent is less than 500 parts by weight, the solution state cannot be maintained. On the other hand, when the amount of the amphiphilic solvent is greater than 10,000 parts by weight, its viscosity decreases and the decreased viscosity may not suitable for the coating.

As noted above, the waterborne polyurethane may be prepared through the reaction of a polyurethane prepolymer with a neutralizing agent and a chain extending agent. The polyurethane prepolymer is prepared by reacting a polyol, a diisocyanate-based compound, and a dispersing agent.

Examples of the polyol include polytetramethylene ether glycol, polypropylene glycol, and polyester polyol, and examples of the diisocyanate-based compound include isophorone diisocyanate and hydrogenated 4,4-diphenyl methane diisocyanate (MDI).

The amount of the diisocyanate-based compound may be in a range of 1 to 3 moles based on 1 mole of the polyol. When the amount of the diisocyanate-based compound is less than 1 mole, polyurethane having a high molecular weight cannot be obtained, and thus binding force between an active material layer using the polyurethane and current collector becomes weaker. On the other hand, when the amount of the diisocyanate-based compound is greater than 3 moles, the polyurethanes are cross-linked in the waterborne state, and thus binding force between an active material layer and current collector becomes weaker once again.

The dispersing agent is a material that assists in the uniform dispersion of the polyol and diisocyanate-based compound, and examples of the dispersing agent include dimethylol butanoic acid, dimethylol propionic acid, or sodium sulfo isophthalic acid. The amount of the dispersing agent may be in a range of 1 to 10 parts by weight, and particularly 2 to 6 parts by weight based on 100 parts by weight of the total weight of the polyol and the diisocyanate-based compound. When the amount of the dispersing agent is less than 1 part by weight, dispersion in water cannot be carried out. On the other hand, when the amount of the dispersing agent is greater than 10 parts by weight, water-proofing characteristics after drying process become poor.

The reaction of the polyol, the diisocyanate-based compound and the dispersing agent to prepare the polyurethane prepolymer may be carried out at a temperature in a range of 40 to 60° C. under an inert atmosphere such as nitrogen and argon.

Then, the prepared polyurethane prepolymer is neutralized using a neutralizing agent. Examples of the neutralizing agent include triethylamine, and trimethylamine. The amount of the neutralizing agent may be in a range of 1.0 to 1.2 moles based on 1 mole of the dispersing agent.

The neutralization may be carried out at a temperature in a range of 20° C. to 40° C.

Then, the neutralized resultant is dispersed in water at room temperature (20° C.) to prepare a prepolymer waterborne dispersion having 30 to 50% by weight of the solid content.

The chain extending agent is added to and reacted with the prepolymer waterborne dispersion to prepare a waterborne polyurethane. The reaction is carried out at a temperature in a range of 30 to 60° C. When the reaction temperature is lower than 30° C., the reaction occurs slowly. On the other hand, when the temperature is higher than 60° C., partial gelation inhibits dispersion in water.

Examples of the chain extending agent include ethylenediamine, diethylenetriamine, and the amount of the chain extending agent may be in a range of 0.50 to 1.0 moles based on 1 mole of the polyurethane prepolymer.

The waterborne polyurethane may be prepared by the reaction of one of polytetramethylene ether glycol and polypropylene glycol with one of isophorone diisocyanate and hydrogenated 4,4-diphenyl methane diisocyanate (MDI).

The waterborne polyurethane may have a weight average molecular weight in a range of 10,000 to 300,000.

20 to 55% by weight of waterborne polyurethane dispersion is prepared by dispersing the prepared polyurethane in water, and the amphiphilic solvent is added thereto to prepare a polyurethane solution. The amount of the amphiphilic solvent is adjusted to be 1 to 20% by weight of polyurethane in the polyurethane solution.

A composition for an electrode active material is prepared by mixing an active material, a conducting agent, the polyurethane solution, and the amphiphilic solvent.

The active material may be at least one material selected from active carbon, carbon nanotubes (CNT), mesoporous carbon, active carbon fiber, a graphite oxide, a metal oxide, and a mixture thereof. The metal oxide may be $RuO_2$, $MnO_2$, or the like.

The conducting agent may be carbon black, vapor growth carbon fiber (VGCF), graphite, or the like, and the amount of the conducting agent may be in a range of about 3 to about 20 parts by weight based on 100 parts by weight of the active material.

The amount of the polyurethane in the polyurethane solution may be in a range of about 3 to about 20 parts by weight based on 100 parts by weight of the active material. When the amount of the polyurethane is less than about 3 parts by weight, binding force of the electrode decreases. On the other hand, when the amount of the polyurethane is greater than about 20 parts by weight, capacity per unit area and unit volume decreases.

The amount of the amphiphilic solvent may be in a range of about 500 to about 1000 parts by weight based on 100 parts by weight of the active material.

The prepared composition for an electrode active material is coated on a support and dried to form an electrode for capacitive deionization device.

The support which has a three-dimensional structure can be formed of at least one selected from carbon paper, carbon felt, carbon cloth, metal foam, metal paper, metal felt, and metal cloth. The metal forming the metal foam, metal felt and metal cloth may be titanium, nickel, plated copper, or the like.

The drying process is carried out at a temperature in a range of 60 to 150° C.

A schematic structure of the electrode according to an embodiment is shown in FIG. 1.

Referring to FIG. 1, an electrode includes an active material layer having active carbon 12 as the active material, a polyurethane binder 11 coated on the surface of the active carbon 12, and a conducting agent (not shown) on a support 10. A current collector (not shown) is further used to prepare the electrode.

The capacitive deionization device of this embodiment includes the above electrode.

In the embodiment, the capacitive deionization device is effectively used in a water purifier. In particular, the device is suitable for use as a water softener, wherein hard water is converted to soft water by removing cations in water. The water softener which convents hard water to soft water is a system reducing the amount of cations in water, particularly bivalent cations such as $Ca^{2+}$ and $Mg^{2+}$.

In the capacitive deionization device when used as a water softener, an electrolyte may be an aqueous solution, for example tap water.

Water softer, which is embodied by a capacitive deionization device according to an embodiment, will be described with reference to FIGS. 2A and 2B.

Figure 2A:
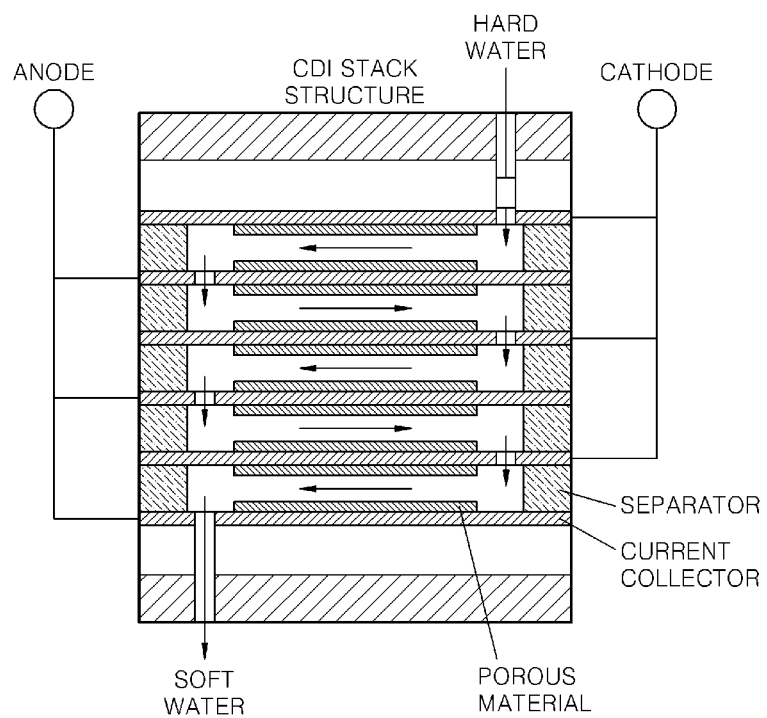
FIGS. 2A and 2B show a capacitive deionization device.
Figure 2B:
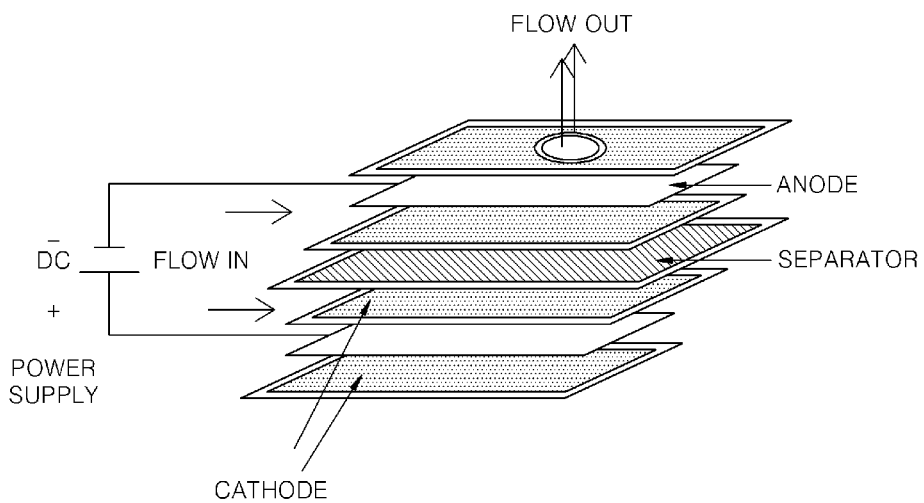

FIG. 2A schematically shows a serpentine type capacitive deionization device for softening water, and FIG. 2B schematically shows a planar type capacitive deionization device for softening water.

Referring to FIGS. 2A and 2B, the capacitive deionization device for softening water includes a capacitive deionization (CDI) stack having an electrode, a power source for supplying power thereto, a hard water inlet pipe through which hard water flows in the CDI stack, and a soft water outlet pipe through which soft water generated in the CDI stack flows out. An isolation film is interposed between the cathode and the anode to prevent the cathode and the anode from being adhered to each other. A porous material in FIG. 2A is an electrode active material such as active carbon.

The CDI stack includes a pair of electrodes for capacitive deionization, a separator interposed therebetween, and an electrolyte disposed between the cathode and the anode to allow current to flow. Examples of the separator include a polyethylene membrane and a polypropyl membrane.

The capacitive deionization device when used as a water softener illustrated in FIGS. 2A and 2B uses the CDI technology to soften hard water.

In addition, an electrode for an electrochemical double layer capacitor includes an active material, polyurethane, and a conducting agent. In the electrode for an electrochemical double layer capacitor, the amphiphilic solvent is used as the electrode for capacitive deionization device. The hydrophobic polyurethane reacts with the amphiphilic solvent, for example, a hydrophobic group of alcohol, and is dissolved therein. As a result, the composition for the active material has stability and displays excellent adhesion to a current collector because of using the polyurethane and because of not the CMC.

The electrode for an electrochemical double layer capacitor includes a pair of electrodes, a separator interposed therebetween, and an electrolyte disposed between the electrodes to allow current to flow.

The electrolyte may be an aqueous solution in which a salt is dissolved. The electrolyte may be 0.5 to 6 M of one of sodium chloride solution, magnesium sulfate solution, and calcium sulfate solution, or a high concentration (5 to 100 wt %) of sulfuric acid or phosphoric acid.

The electrolyte may be tap water.

Figure 3:
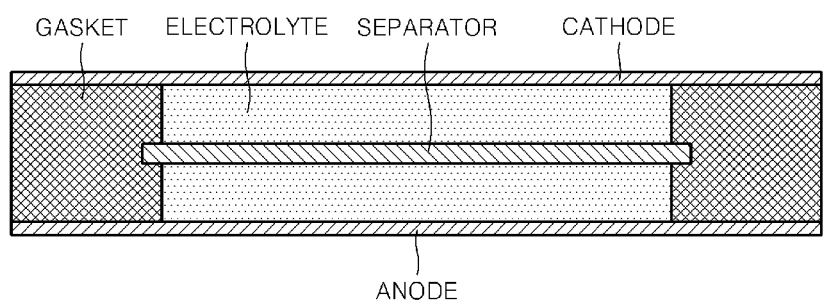
FIG. 3 shows an electrochemical double layer capacitor.

FIG. 3 shows an electrochemical double layer capacitor employing a cathode and an anode according to an embodiment.

Referring to FIG. 3, the electrochemical double layer capacitor includes a cathode having a positive electrode, an anode having a negative electrode, which is spaced apart from the cathode such that the cathode and anode have a symmetrical form. A separator is formed between the cathode and the anode to prevent the two electrodes from adhering to each other. An electrolyte is disposed between the cathode and the anode to allow current to flow. A gasket is provided for preventing the electrolyte from flowing out.

The cathode includes a current collector formed of a wide flat plate; the wide flat plate being electrically conducting, and a cathode electrode unit including an active material, polyurethane as a binder, and a conducting agent on the current collector.

The anode includes a current collector formed of a wide flat plate; the wide flat plate being electrically conducting, and an anode electrode unit formed on the current collector in which an active material, a polyurethane as a binder, and a conducting agent are coated on the anode electrode unit The current collector included in the cathode and the anode may be selected from the group consisting of carbon plate, carbon paper, metal plate, metal mesh, and metal foam, and may be formed of aluminum, nickel, copper, titanium, stainless still, iron, or the like.

Hereinafter, a method of manufacturing the electrochemical double layer capacitor according to an embodiment will be described.

First, a cathode and an anode are prepared in the same manner as in the preparation of the electrode for capacitive deionization device and thus details thereon are not repeated.

A separator is interposed between the prepared cathode and the anode, and the electrolyte is disposed between the cathode and the anode to allow current to flow thereby forming an electrochemical double layer capacitor.

The separator may be a polypropylene membrane, a polyethylene membrane, or the like.

The electrolyte may be an aqueous solution in which a salt is dissolved as described above, and preferably sodium chloride solution.

The electrochemical double layer capacitor according to the present invention is applied to store electricity.

The following examples are for illustrative purposes and are not intended to limit the scope of the invention.

SYNTHESIS EXAMPLE 1

Synthesis of Polyurethane, Which is Dispersible in Water 99.6 g of isophorone diisocyanate and 11.2 g of dimethylol butanoic acid were added to a 1 L four-neck round-bottomed reactor, and the reactor was slowly stirred under nitrogen atmosphere. 150.0 g of polytetramethylene ether glycol having a weight average molecular weight of 1000 grams per mole was added to the reactor in 2 or 3 stages while the temperature was maintained at 40° C. When the adding process was terminated and the temperature was stabilized, the reactor was heated to 60° C. and reacted until the mixture had a theoretical NCO value. The reaction was performed for about 4 to 6 hours, and the reaction time was varied according to the type of polyol and the amount of ionic groups. When the theoretical NCO value was obtained, the reactor was cooled to 30° C. and triethylamine of the same molar amount as dimethylol butanoic acid was added thereto. The resultant was neutralized for 30 to 40 minutes while the temperature was maintained at 40° C. After the neutralization, the reactor was cooled to be 20° C. or less, and 381.5 g of distilled water was added thereto, and then the reactor was stirred at 1000 rpm to disperse the solution. When the dispersion was stabilized, 13.4 g of ethylene diamine dissolved in 30 g of the distilled water was slowly added to the reactor. When the ethylene diamine was added, heat was abruptly generated because of an exothermic reaction to raise the temperature of the reactor to around 40° C. Then, the temperature was stabilized at 60° C. and the reaction was performed for further 2 hours to prepare a waterborne polyurethane.

EXAMPLE 1

Preparation of Electrode and Cell

1) Preparation of 5% by Weight of Polyurethane Solution

40% by weight of polyurethane waterborne dispersion prepared by dispersing the polyurethane prepared according to Synthesis Example 1 in water was used. 700 parts by weight of 1-butanol were added to 100 parts by weight of the polyurethane waterborne dispersion to prepare 5% by weight of clear polyurethane solution.

2) Preparation of Slurry for Electrode Active Material 0.9 g of active carbon having a specific surface area of 1300 $m^2/g$ and 0.1 g of carbon black were added to a stirring vessel, and then 2 g of the prepared 5% by weight of polyurethane solution was added thereto, and the reactor was stirred in a high speed stirrer for 3 minutes. 1 g of 1 butanol was added thereto, and the reactor was stirred for additional 3 minutes to prepared slurry for electrode active material.

3) Coating of Slurry for Electrode Active Material

The slurry for an electrode active material was coated on a carbon paper. The amount of the coated slurry was adjusted to about 10 $mg/cm^2$.

4) Drying

The resultant was dried at room temperature for 10 minutes and in an oven at 80° C. for 2 hours to prepare electrodes.

5) Preparation of Cell

The dried electrode was cut into pieces of 3×3 (9 $cm^2$) and the weight of two pieces were measured.

The electrode was impregnated with an electrolyte (1 M NaCl solution).

The electrode prepared in operation, separator, and gasket are assembled to form a cell.

Pressure, adjusted to 1N-m Torque, was applied to the cell using a wrench to assemble a cell.

COMPARATIVE EXAMPLE 1

First, a polytetrafluoroethylene (PTFE) suspension was prepared according to the following process.

5 g of 10% by weight of aqueous isopropyl alcohol solution was added to 1 g of 60% by weight of aqueous PTFE suspension to prepare a PTFE suspension.

0.9 g of active carbon having specific surface area of 1300 $m^2/g$ and 0.1 g of carbon black were added to a stirring vessel, and 2 g of the prepare PTFE suspension was added thereto to prepare slurry for an electrode active material layer.

Then, an electrode was prepared in the same manner as in Example 1 using the slurry for an electrode active material layer, and a cell was prepared using the electrode.

COMPARATIVE EXAMPLE 2

40% by weight of polyurethane waterborne dispersion was prepared by dispersing the polyurethane prepared according to Synthesis Example 1 in water.

0.9 g of active carbon having specific surface area of 1300 $m^2/g$ and 0.1 g of carbon black were added to a stirring vessel, and then 2 g of the prepared 5% by weight of polyurethane waterborne dispersion and 1 g of distilled water were added thereto, and the reactor was stirred in a high speed stirrer for 3 minutes. Here, the slurry for an electrode active material layer did not have a uniform composition since the polyurethane waterborne dispersion, active carbon, and carbon black were not properly mixed.

Preparation of an electrode was attempted by coating the slurry for an electrode active material on a carbon paper and drying the slurry. However, it was impossible to prepare a uniform electrode.

Current-voltage characteristics of cells prepared according to Example 1 and Comparative Examples 1 and 2 were evaluated. A method of evaluating the cells is described below, and the results are shown in Table 1 below.

Evaluation of Current-voltage Characteristics of Cells

The cell was tested at room temperature while a sufficient amount of electrolytic solution was supplied.

The cell was charged with a constant current (20 mA, 1.2 V cutoff) and a constant voltage (1.2 V, 2 mA cutoff), and discharged with a constant current (20 mA).

TABLE 1

| | Loading amount of electrode (mg/cm$^2$) | Capacitance (F/g) | (C/cm$^2$) |
|---|---|---|---|
| Example 1 | 10.8 | 83.0 | 1.08 |
| Comparative Example 1 | 12.3 | 57.6 | 0.70 |
| Comparative Example 2 | Unable to measure | Unable to measure | Unable to measure |

In Table 1, the loading amount of electrode indicates the amount of loading active materials.

As shown in Table 1, the capacitance characteristics of Example 1 were improved even though a lower loading amount was used compared to those of Comparative Example 1.

According to the embodiments, the electrode for capacitive deionization device and the electrode for an electrochemical double layer capacitor have stabilized compositions for electric active material without an additional thickening agent, and thus provide for improved processing characteristics, improved electrode capacity, increased electric conductivity using a three-dimensional support, and improved output characteristics by smoothing contact with the electrolyte.

While the disclosed embodiments has been shown and described with reference to exemplary embodiments thereof, it will be understood by those of ordinary skill in the art that various capacitive deionization devices and electrochemical double layer capacitors may be made without departing from the spirit and scope of the present invention as defined by the following claims.

In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. An electrode for capacitive deionization comprising:
    an active material;
    a waterborne polyurethane; and
    a conducting agent,
    wherein the active material is active carbon,
    wherein the electrode is a product obtained by coating a composition for an electrode active material on a support and drying the composition, the composition including a uniform dispersion of the active material, a waterborne polyurethane dispersion, the conducting agent, and an amphiphilic solvent, the amount of the waterborne polyurethane of the electrode is in a range of about 3 to about 11.1 parts by weight based on 100 parts by weight of the active material in the electrode, the conducting agent is carbon black, vapor growth carbon fiber (VGCF), or graphite, and the amount of the conducting agent is in the range of 3 to 20 parts by weight based on 100 parts by weight of the active material, wherein the waterborne polyurethane is a product of reaction of a prepolymer, the prepolymer being prepared by reacting components consisting of a polytetramethylene ether glycol with an isophorone diisocyanate and dimethylol butanoic acid.

2. The electrode of claim 1, wherein the electrode consists of the active material, the waterborne polyurethane, and the conducting agent.

3. The electrode of claim 1, wherein the amphiphilic solvent is butanol.

4. A capacitive deionization device comprising an electrode comprising:
    an active material;
    a waterborne polyurethane; and
    a conducting agent,
    wherein the active material is active carbon,
    wherein the electrode is a product obtained by coating a composition for an electrode active material on a support and drying the composition, the composition including a uniform dispersion of the active material, a waterborne polyurethane dispersion, the conducting agent, and an amphiphilic solvent, wherein the amount of the waterborne polyurethane of the electrode is in a range of about 3 to about 20 parts by weight based on 100 parts by weight of the active material in the electrode, the conducting agent is carbon black, vapor growth carbon fiber (VGCF), or graphite, and the amount of the conducting agent is in the range of 3 to 20 parts by weight based on 100 parts by weight of the active material, wherein the waterborne polyurethane is a product of reaction of a prepolymer, the prepolymer being prepared by reacting components consisting of a polytetramethylene ether glycol with an isophorone diisocyanate and dimethylol butanoic acid.

5. The capacitive deionization device of claim 4, wherein electrode of the capacitive deionization device consists of the active material, the waterborne polyurethane, and the conducting agent.

* * * * *